J. R. FOUCH.
TRACTOR DEVICE.
APPLICATION FILED FEB. 13, 1917.
1,282,683.
Patented Oct. 22, 1918.
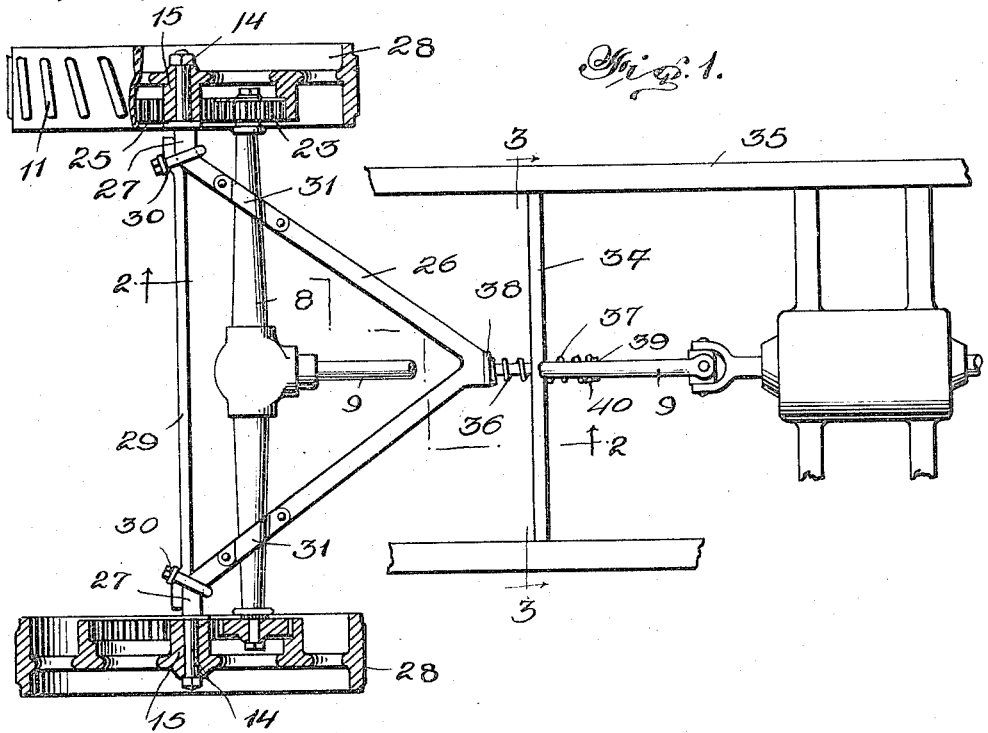
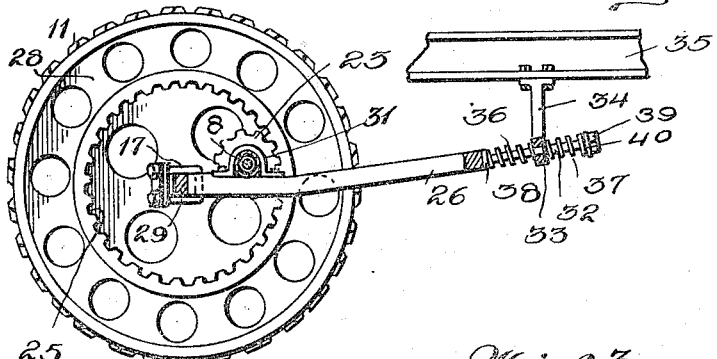
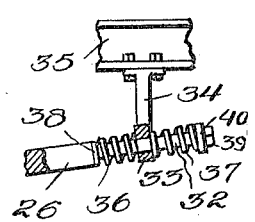
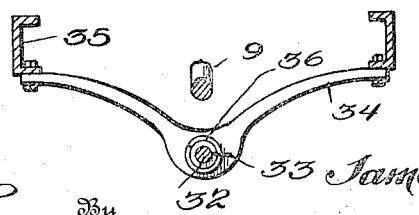
Witness
Ernest A. Crocker
Inventor
James R. Fouch
By F. W. Bond, Attorney

UNITED STATES PATENT OFFICE.

JAMES R. FOUCH, OF LOS ANGELES, CALIFORNIA.

TRACTOR DEVICE.

1,282,683.  Specification of Letters Patent.  Patented Oct. 22, 1918.

Original application filed February 7, 1916, Serial No. 76,551. Divided and this application filed February 13, 1917. Serial No. 148,424.

*To all whom it may concern:*

Be it known that I, JAMES R. FOUCH, a citizen of the United States, residing at Los Angeles, in the county of Los Angeles and State of California, have invented a new and useful Tractor Device, of which the following is a specification.

This invention relates to improvements in traction devices and has particular relation to mechanism for converting vehicles of various types into vehicles having greater traction power, and especially into vehicles adapted to operate as tractors, such as are commonly employed in various agricultural pursuits. The present application is a division of my application Serial No. 76,551 for patent on tractor device filed Feb. 7, 1916, and the invention herein claimed resides in providing a loose engagement between the yoke frame and the vehicle chassis.

It is an object of the invention to provide a traction mechanism which may be readily applied to any ordinary vehicle, and especially to a vehicle designed for road travel, whereby the vehicle is adapted for use on loose, uneven surfaces of ground or on cultivated ground, the vehicle practically becoming a tractor.

It is also an object of the invention to provide a tractor attachment which may be secured upon the running gear of a road vehicle, broad tractor wheels being substituted for the usual road drive wheels of the vehicle.

A further object of the invention is to provide a tractor attachment of the character mentioned in which a yoke frame carries the tractor wheels and loosely engages the vehicle chassis.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim without departing from the spirit or sacrificing any of the advantages of the invention.

In the accompanying drawings:

Figure 1 is a plan view of a portion of a vehicle showing my improved tractor device applied thereto, parts being broken away for the purpose of illustration.

Fig. 2 is a vertical sectional view on the line 2—2, Fig. 1.

Fig. 3 is a section on the line 3—3, Fig. 1.

Fig. 4 is a detail fragmentary sectional view of the cross bar connection interposed between the tractor mechanism and the chassis.

Similar numerals of reference indicate corresponding parts throughout the several figures of the drawings.

The traction or tractor mechanism of this invention is designed to make it possible to employ any ordinary light road vehicle for heavier work, and particularly for work as a tractor in agricultural pursuits, as for instance, in moving over soft, loose or cultivated ground, whereby the device makes it possible to draw or move cultivating implements and mechanisms over the ground. Practical embodiments of the invention have been illustrated in the accompanying drawing, and the details and features of the invention will now be set forth, reference being had thereto.

In the said drawing 35 indicates the chassis or main frame, 8, the casing of the rear or driving axle and 9 the drive shaft communicating motion from the engine to the driving axle. All of these parts may be of any usual or ordinary type and may be used to represent the parts of light road vehicles or heavier passenger carrying vehicles or the like. The mechanism of the present invention is adapted for easy connection and attachment to the parts mentioned, without the necessity of any change therein, other than the removal of the drive wheels which are commonly employed in road travel.

The tractor attachment preferably comprises traction wheels 28 made with a broad ground engaging tread which may be roughened or provided with cleats 11. The tractor mechanism is connected to the chassis of the vehicle by means of a yoke member 26 having its outer ends turning outwardly as at 27 and provided with journals 14 adapted to engage journal bearings 15 formed in the hubs of the wheels 28. A cross brace bar 29 is employed, the ends of which are preferably clamped at 30 to the yoke just inside the journal end portions thereof. The yoke is adapted to be clamped at 31 to the axle casing of the vehicle and projects forward therefrom, its inner end being provided with a reduced portion forming a bolt 32 which engages an aperture or bearing 33 formed in the central depressed portion of the cross-bar 34 which is connected to the side bars of the chassis 35. The said bar 34 is so shaped as not to interfere with the drive shaft of the vehicle and is therefore usually centrally depressed as best shown in Fig. 3 of the drawings. The bolt 32 extends through the aperture 33 and springs 36 and 37 may, if desired, be provided thereon, one on each side of the bar 34. A shoulder 28 upon the yoke 26 limits the position of the spring 36 upon one side of the bar 34 while a nut 39 and a washer 40 limit the position of the spring 37 on the other side of the bar 34 as will be clearly understood by reference to Fig. 4 of the drawings. The movement of the chassis with respect to the casing of the rear axle will thus be accommodated without preventing the proper holding of the tractor frame in place.

The motive power for the traction wheels 28 is taken from the drive axle of the vehicle and any suitable chain of intermediate driving means may be employed within the spirit of this invention. An effective means is shown in the drawings where gear pinions 23 are shown applied to the ends of the drive shaft, from which the usual road drive wheels have been removed. The said pinions are secured to the drive shaft in the same way that the drive wheels were, and are therefore adapted to be rotated thereby. These gear pinions 23 mesh with the teeth of internal gears 25 carried by the tractor wheels 28. The internal gears 25 are usually formed on or secured upon the spokes of the tractor wheels shown in Figs. 1 and 2 of the drawing. It will be readily understood that other means of imparting movement from the drive shaft of the vehicle to the tractor wheels may be employed as for instance sprocket wheels or connecting chains or gearing of any kind without departing in the least from the spirit of the invention.

While the frame or yoke of the tractor has been shown of an angular form, it will be evident that a rectangular frame may be used or a frame having any other desired shape, and which can be readily attached or removed from the running gear of the vehicle, within the spirit and scope of the invention.

It will be observed also that the minor details of the invention may be considerably changed and that mechanical equivalents may be substituted for some of the parts shown and described, all within the spirit of the invention. It will be seen that in applying the tractor mechanism that it is only necessary to remove the usual drive wheels of the vehicle, in order to adapt it to receive the mechanism of the tractor and that it is only necessary to remove the tractor mechanism and restore the vehicle wheels in order to have the said vehicle ready for road use in the ordinary way. The ready adaptability of the mechanism to any automobile or motor vehicle will thus be apparent, as well as the ease and facility with which the changes can be made.

Although the drawings and above specification disclose the best mode in which I have contemplated embodying my invention I desire to be not limited to the details of such disclosure, for in the further practical application of my invention, many changes in form and construction may be made, as circumstances require or experience suggests, without departing from the spirit of the invention, within the scope of the appended claim.

I claim:

A tractor mechanism comprising a yoke frame adapted to be connected with the casing of a vehicle drive axle, a transverse brace bar mounted upon the vehicle chassis and provided with an aperture, a straight headed portion provided upon said yoke, and located through said aperture, a coil spring located around said straight headed portion upon each side of said brace bar and tractor wheels carried by said yoke frame.

In testimony that I claim the above, I have hereunto subscribed my name.

JAMES R. FOUCH.

Copies of this patent may be obtained for five cents each, by addressing the "Commissioner of Patents, Washington, D. C."